United States Patent [19]

Wasson

[11] Patent Number: 4,457,096

[45] Date of Patent: Jul. 3, 1984

[54] FISHING LURE

[75] Inventor: John J. Wasson, Alexandria, La.

[73] Assignee: Smithwick Lures, Inc., Shreveport, La.

[21] Appl. No.: 299,111

[22] Filed: Sep. 3, 1981

[51] Int. Cl.³ ............................................. A01K 85/00
[52] U.S. Cl. ................................................... 43/42.42
[58] Field of Search .................. 43/42.25, 42.3, 42.42, 43/42.39, 43.2

[56] References Cited

U.S. PATENT DOCUMENTS

| | | | |
|---|---|---|---|
| 832,929 | 10/1906 | Stanley | 43/43.2 |
| 1,583,199 | 5/1926 | Taylor | 43/42.42 |
| 1,929,150 | 10/1933 | Peckinpaugh | 43/42.42 |
| 4,012,862 | 3/1977 | Dubois | 43/42.42 |

Primary Examiner—Nicholas P. Godici
Assistant Examiner—M. Jordan
Attorney, Agent, or Firm—William R. Laney

[57] ABSTRACT

A fishing lure including a hook having an eye, a point and a shank extending from the eye to the point, with the eye, shank and point lying substantially in a common plane, a pair of divergent legs, each having a proximal end connected to the hook at a location substantially in the common plane and extending away from the hook at an acute angle to the common plane and defining an acute angle between such legs. Each leg defines an obtuse angle with the hook shank and extends away from the point, and each leg has a distal end connected to a toe which extends substantially parallel to said common plane. Each toe is bent from the line of the respective leg axis toward the point of the hook to define an obtuse angle with the leg axis. The legs are weighted near their ends, and the hook shank has a bucktail or the like affixed thereto.

4 Claims, 5 Drawing Figures

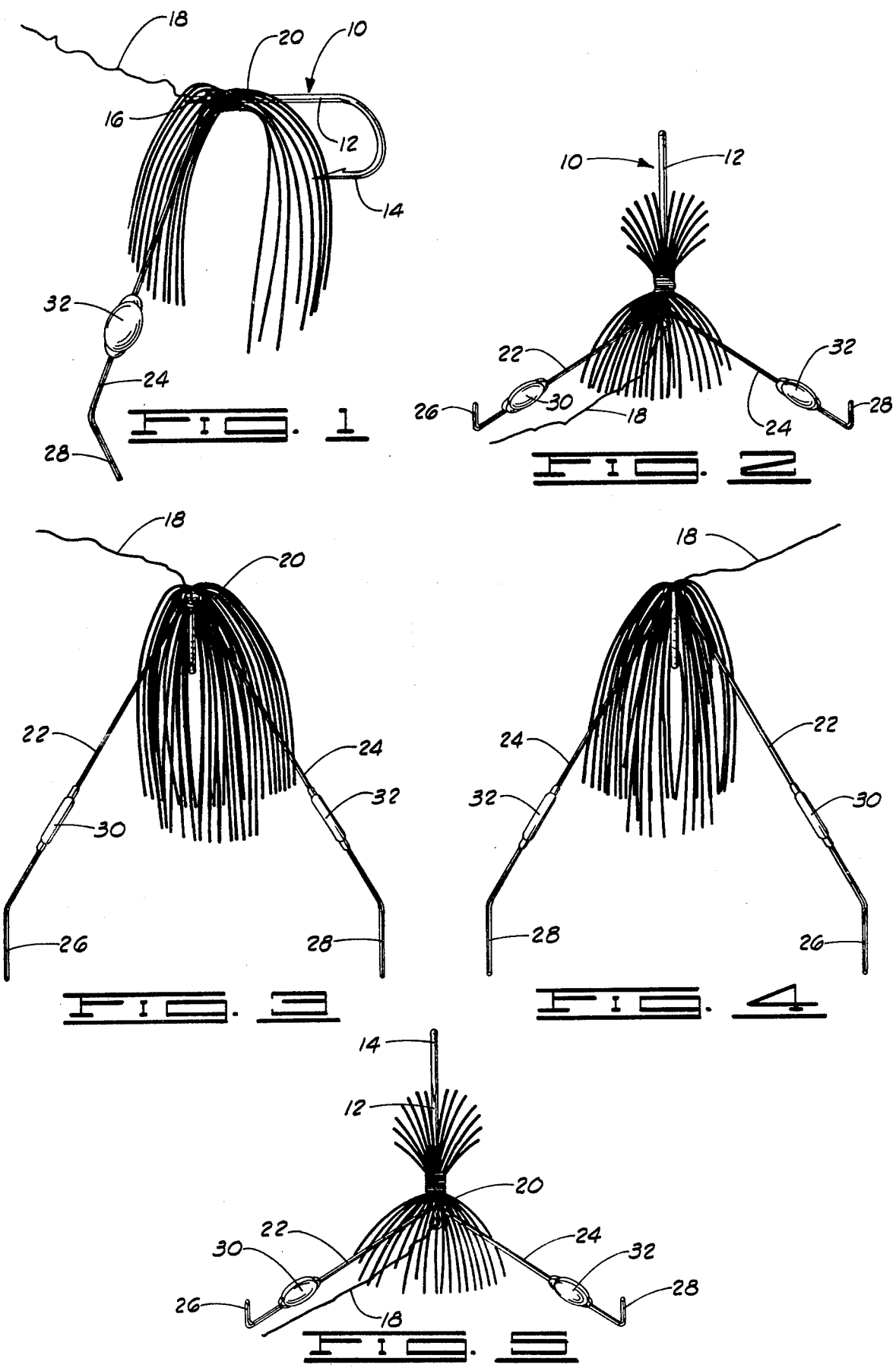

FISHING LURE

BACKGROUND OF THE INVENTION

1. Field of the Invention

This invention relates to fishing lures, and more particularly, to fly-type submerged or deep water lures.

2. Brief Description of the Prior Art

A variety of types of fishing lures have heretofore been proposed and utilized with varying degrees of success. Many of these lures include some type of attention-attracting element, such as a bucktail, skirt or the like, and many include thin wire weed guard elements which extend from the shank of the lure hook at some angle calculated to provide maximum anti-fouling effect with respect to weeds and other obstructions in the water. Patents which are directed to fishing lures having weed guards made up of a pair of divergent spring metal wires or legs formed in a V configuration are U.S. Pat. No. 3,131,504 to Haulk, U.S. Pat. No. 1,702,074 to Comstock, U.S. Pat. No. 1,050,529 to Fearing and U.S. Pat. No. Des. 215,090 to Bruckner. Each of the described patents differs from the present invention, however, in its geometric arrangement of parts, and the way the lure is balanced and progresses through the water during retrieval, and in the type of action imparted to the lure by a steady retrieval.

BRIEF DESCRIPTION OF THE PREFERRED INVENTION

The present invention provides an improved fishing lure which has proven to be very effective in attracting and catching fish. Broadly described, the lure includes a conventional hook which includes the usual eye, for line attachment, and a barbed point, with an elongated shank extending between the eye and point and undergoing a U-shaped curve at a location adjacent the point. As with most single tine fishing hooks, the eye, shank and point lie substantially in a common plane.

In the lure of the invention, a pair of divergent legs, each having a proximal end connected to the hook at a location substantially in the described common plane and extending away from this point of connection at an acute angle to such common plane, are provided, and in their particular arrangement and location constitute an important feature of the present invention. The legs diverge from each other so as to define an acute angle between them. The legs further define an obtuse angle with the shank so as to extend generally away from the hook point and in the general direction of the hook eye. Each leg also has a distal end which is connected to a toe. Each toe extends substantially parallel to the aforementioned common plane, and is bent from the line of the axis of the respective leg to which it is attached in a direction back toward the point of the hook so as to define with its respective leg, an obtuse angle. The legs are weighted near their distal ends, and the hook shank has a bucktail or the like affixed thereto.

During retrieval, the lure progresses through the water with the shank of the hook in a generally horizontal direction with the toes carried on the distal ends of the legs of the hook serving both to prevent weed impalement, and also to support the hook above the bottom of the body of water in which it is used. The action of the lure as it is retrieved is extremely attractive to fish, and the fluttering bucktail appears to remain oriented so as to effectively induce strikes by the fish.

An important object of the invention is to provide a fishing lure which is very effective in the catching of fish.

Another object of the invention is to provide a fishing lure which can be manufactured at relatively low cost, and which can be used over a long service life without malfunctioning.

These, as well as additional objects and advantages, will become more apparent and will be better understood as the following detailed description is read in conjunction with the accompanying drawings which illustrate a preferred embodiment of the invention.

GENERAL DESCRIPTION OF THE DRAWINGS

FIG. 1 is a side elevation view of a preferred embodiment of the fishing lure of the invention.

FIG. 2 is a top plan view of the fishing lure.

FIG. 3 is a front elevation view of the fishing lure.

FIG. 4 is a rear elevation view of the fishing lure.

FIG. 5 is a bottom plan view of the fishing lure.

DETAILED DESCRIPTION OF A PREFERRED EMBODIMENT OF THE INVENTION

Referring initially to FIG. 1 of the drawings, a preferred embodiment of the fishing lure of the invention is therein illustrated. The fishing lure includes a hook designated generally by reference numeral 10, which hook has the usual shank 12, barbed point 14 and eye 16. The fishing line 18 is attached to the eye in conventional fashion. In the illustrated embodiment, a bucktail 20 is secured to the shank at a location relatively near the eye 16. A part of the bucktail thus tends to obscure and surround the point of joinder to the shank 12 of the proximal ends of pair of divergent legs 22 and 24. It will be noted in referring to FIG. 1 that the legs 22 and 24 slant away from the hook point 14 and toward the eye 16 so as to define, when viewed in side elevation, an obtuse angle with the shank 12. Moreover, the legs 22 and 24 may be seen from FIGS. 1 and 2 to occupy a common plane which extends at this same obtuse angle with respect to the axis of the hook shank 12.

When the lure is viewed in end elevation as shown in FIG. 2, it will be perceived that each of the legs 22 and 24 extends at an acute angle to the common plane occupied by the eye 16, shank 12 and hook 14, and that the legs 22 and 24 also extend at an acute angle to each other. The plane of the hook substantially bisects this latter acute angle which is defined between the divergent legs 22 and 24.

At their distal ends which are most remote from the shank 12 of the hook 10, the legs 22 and 24 each carry a toe portion 26 and 28, respectively. Preferably, the toe portions 26 and 28 are formed integrally with or constitute a continuation of, their respective leg 22 and 24, and as is apparent from FIGS. 1 and 3, each is bent in two different planes relative to the projected axis of the leg to which the respective toe portion is connected. Thus, in viewing the lure in elevation as shown in FIG. 3, the toe portions 26 and 28 are each bent to a location where they extend substantially parallel to each other and substantially parallel to the common plane in which the eye 16, shank 12 and point 14 of the hook are located. In a different direction of bend, as shown in FIG. 1, the toe portions 26 and 28 define an obtuse angle with the axis of their respective legs, and may be thought of as being bent from these axes back toward the point 14 of the hook 10. Also as shown in FIG. 1, the toe portions 26 and 28 are bent into and occupy a common plane which extends substantially normal to the common plane of the eye 16, shank 12 and point 14.

At a location which is disposed relatively near to the toe portions 26 and 28 along the legs 22 and 24, a pair of bead-like weights 30 and 32 are provided and function to retain the legs 22 and 24 and toe portions 26 and 28 in a downwardly oriented relationship to the hook 10.

In the use of the lure of the invention, the lure is cast by the fisherman, and free falls to the surface of the water. In its falling, it is oriented by the effect of the weights 30 and 32 so that the toe portions 26 and 28 always strike the water first. The weights then cause the lure to sink to the bottom. On retrieve, the lure stands upon the legs 22 and 24 with the toes 26 and 28 dragging or skidding along the bottom. The prevalent attitude of the lure during retrieve is with the shank 20 of the hook 10 extending at an angle of from about 30° to about 45° to the horizontal with the legs 24 and 26 approaching the vertical. By imparting slight jerking motions to the line 18, the fisherman can cause the lure to hop or skip along the bottom. With slightly muddy bottoms, this causes some slight disturbance of the mud and turbulence in the water where the lure drags the bottom, attracting the attention of nearby fish.

The motions and configuration of the lure are such that it appears to be effective in inducing strikes by fish in the vicinity of the cast, and great success has been realized in employing this lure for catching fish.

Although various changes and innovations can be made in the specific structure of the lure, the illustrated and described preferred embodiment clearly enunciates the basic principles which should be incorporated in any lure following the teachings of this invention. All changes and innovations which thus nevertheless continue to rely upon these basic principles are therefore deemed to be circumscribed by the spirit and scope of the invention, except as the same may be necessarily limited by the appended claims or reasonable equivalents thereof.

What is claimed is:

1. A fishing lure comprising:
   - a hook having a point and an eye and a horizontally extending shank interconnecting the point and the eye, with the eye, point and shank lying substantially in a common vertical plane, said eye constituting the forward portion of said hook and said point being located at the rear portion of said hook when the hook is disposed in a horizontal attitude;
   - a pair of legs connected to the hook shank at substantially the same location therealong near said eye and diverging from each other at an acute angle with respect to each other and at locations on opposite sides of said common plane, each of said legs lying at the same acute angle with respect to said common plane as the other of said legs, said legs each extending at an obtuse angle to said hook shank and extending in a direction forwardly and away from said point, and extending to a location forward of said eye and forward of the entire hook; and
   - a toe connected to the end of each of said legs opposite its end connected to said shank, and angled at an obtuse angle to the axis of its respective leg in two different planes, each of said toes extending rearwardly and downwardly from the axis of its respective leg in the general direction of the point of said hook, and extending at an acute angle to the vertical when said hook shank extends horizontally, said toes lying completely ahead of said eye and on the opposite side of said eye from the point of the hook; and
   - a weight on each of said legs at a location between the point of connection of the respective leg to the hook shank, and the point of connection of one of said toes to the end of the respective leg opposite its end connected to the hook shank.

2. A fishing lure as defined in claim 1 wherein said toes extend substantially parallel to each other.

3. A fishing lure as defined in claim 1 wherein said toes extend substantially parallel to said common plane.

4. A fishing lure as defined in claim 1 and further characterized as including flexible fish attracting means attached to said shank between said point and eye.

* * * * *